US011236933B2

(12) United States Patent
Bryant et al.

(10) Patent No.: US 11,236,933 B2
(45) Date of Patent: Feb. 1, 2022

(54) INTEGRAL SERVICE REFRIGERANT PUMP

(71) Applicant: Carrier Corporation, Palm Beach Gardens, FL (US)

(72) Inventors: Martin D. Bryant, Mooresville, NC (US); Hsihua Li, Huntersville, NC (US); Areeya Xiong, Mt. Holly, NC (US)

(73) Assignee: CARRIER CORPORATION, Palm Beach Gardens, FL (US)

( * ) Notice: Subject to any disclaimer, the term of this patent is extended or adjusted under 35 U.S.C. 154(b) by 123 days.

(21) Appl. No.: 16/609,141

(22) PCT Filed: May 23, 2018

(86) PCT No.: PCT/US2018/034149
§ 371 (c)(1),
(2) Date: Oct. 28, 2019

(87) PCT Pub. No.: WO2018/217904
PCT Pub. Date: Nov. 29, 2018

(65) Prior Publication Data
US 2020/0191455 A1   Jun. 18, 2020

Related U.S. Application Data

(60) Provisional application No. 62/510,037, filed on May 23, 2017.

(51) Int. Cl.
*F25B 41/00* (2021.01)
*F25B 43/02* (2006.01)
(Continued)

(52) U.S. Cl.
CPC ............ *F25B 43/02* (2013.01); *F24F 5/0017* (2013.01); *F25B 31/004* (2013.01); *F25B 41/00* (2013.01);
(Continued)

(58) Field of Classification Search
CPC ................ F25B 31/002; F25B 2500/16; F25B 2345/001; F25B 2345/002; F25B 2345/003; F25B 2345/004
See application file for complete search history.

(56) References Cited

U.S. PATENT DOCUMENTS 4,967,570 A   11/1990 Steenburgh, Jr.
5,040,382 A   8/1991 Abraham
(Continued)

FOREIGN PATENT DOCUMENTS

CN   204006829 U   12/2014
EP   1041347 A2   10/2000
(Continued)

OTHER PUBLICATIONS

ISR/WO, Issued Aug. 31, 2018.

*Primary Examiner* — Jonathan Bradford
(74) *Attorney, Agent, or Firm* — Cantor Colburn LLP

(57) ABSTRACT

A chiller system is provided and includes a chiller, a lubrication assembly and a controller. The chiller includes a compressor, a condenser, an expansion assembly and an evaporator in fluid communication with one another. The lubrication assembly is operably coupled to the compressor, the condenser and the evaporator and is formed to define first-third pathways via a three-way valve and a fourth pathway. The first pathway is configured for pumping refrigerant through the chiller, the second pathway is configured for pre-storing refrigerant in the chiller, the third pathway is configured for removing refrigerant from the chiller and the fourth pathway is configured for charging refrigerant into the chiller. The controller is configured to control the lubrication assembly to selectively engage one of the first-fourth pathways.

14 Claims, 4 Drawing Sheets

(51) Int. Cl.
*F24F 5/00* (2006.01)
*F25B 31/00* (2006.01)
*F25B 49/02* (2006.01)
*F25B 41/40* (2021.01)

(52) U.S. Cl.
CPC .............. *F25B 41/40* (2021.01); *F25B 49/02* (2013.01); *F25B 2345/001* (2013.01); *F25B 2345/002* (2013.01); *F25B 2345/003* (2013.01); *F25B 2345/004* (2013.01); *F25B 2345/006* (2013.01); *F25B 2600/2507* (2013.01)

(56) References Cited

U.S. PATENT DOCUMENTS

| | | | |
|---|---|---|---|
| 5,117,641 A | 6/1992 | Keltner | |
| 5,182,919 A | 2/1993 | Fujiwara | |
| 5,235,821 A | 8/1993 | Sevrain et al. | |
| 5,497,629 A | 3/1996 | Rafalovich et al. | |
| 5,606,862 A | 3/1997 | Peckjan et al. | |
| 6,176,092 B1 * | 1/2001 | Butterworth | F04D 29/023 |
| | | | 62/193 |
| 6,209,338 B1 | 4/2001 | Thatcher, Jr. | |
| 6,250,102 B1 | 6/2001 | Tischer | |
| 6,779,515 B2 | 8/2004 | Vaught et al. | |
| 8,616,011 B2 | 12/2013 | Brown et al. | |
| 8,978,394 B2 | 3/2015 | Koldewey et al. | |
| 2010/0257880 A1 | 10/2010 | Alden | |
| 2013/0098092 A1 | 4/2013 | Wakamoto et al. | |

FOREIGN PATENT DOCUMENTS

| | | |
|---|---|---|
| JP | H0391656 B2 | 4/1991 |
| JP | H03091657 A | 4/1991 |
| JP | H10185342 A2 | 12/1996 |
| JP | 2705034 B2 | 1/1998 |
| JP | H03091655 A | 2/2003 |
| KR | 101639798 B1 | 7/2016 |

* cited by examiner

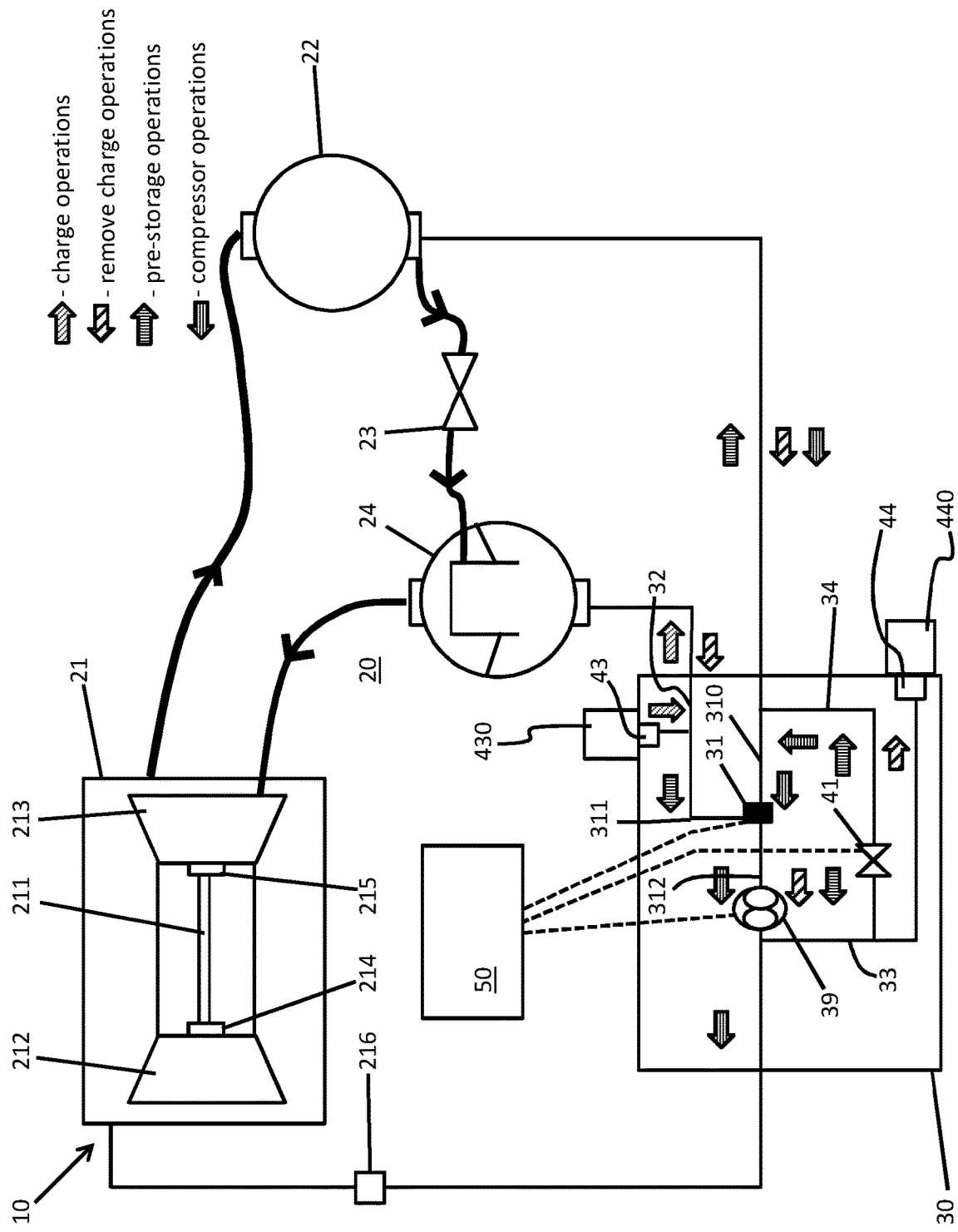

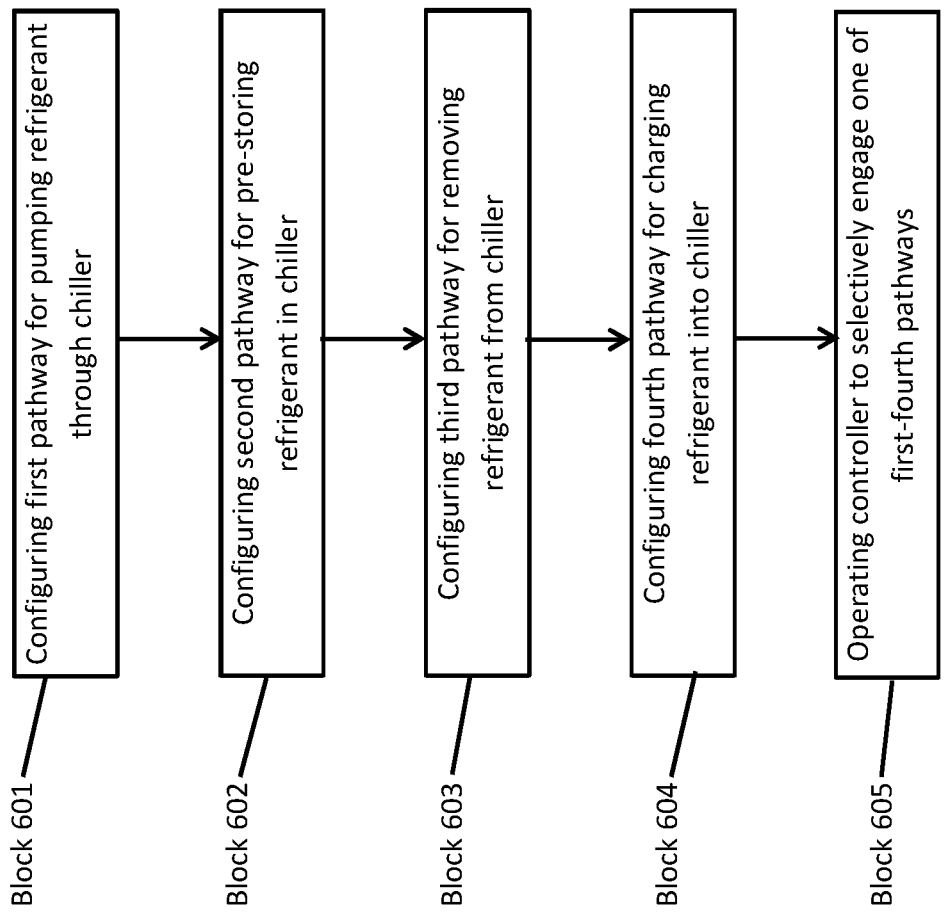

INTEGRAL SERVICE REFRIGERANT PUMP

CROSS-REFERENCE TO RELATED APPLICATIONS

This application claims the benefit of PCT/US2018/034149 filed May 23, 2018, which claims priority to U.S. Provisional Application No. 62/510,037 filed May 23, 2017, which is incorporated herein by reference in its entirety.

BACKGROUND

The following description relates to chillers and, more particularly, to chillers with a refrigerant handling system having an integral service refrigerant pump.

When low pressure refrigerant is handled during a servicing operation of a chiller, a refrigerant handling system is required to transfer the refrigerant into a storage location before the chiller is opened to atmospheric pressure. This is performed with a refrigerant pumping system that is external from the chiller. The refrigerant pumping system pushes refrigerant vapor into the chiller and thereby pushes liquid refrigerant into a storage vessel. This "push/pull" system requires multiple hoses and is common practice in industry.

BRIEF DESCRIPTION

According to one aspect of the disclosure, a chiller system is provided and includes a chiller, a lubrication assembly and a controller. The chiller includes a compressor, a condenser, an expansion assembly and an evaporator in fluid communication with one another. The lubrication assembly is operably coupled to the compressor, the condenser and the evaporator and is formed to define first-third pathways via a three-way valve and a fourth pathway. The first pathway is configured for pumping refrigerant through the chiller, the second pathway is configured for pre-storing refrigerant in the chiller, the third pathway is configured for removing refrigerant from the chiller and the fourth pathway is configured for charging refrigerant into the chiller. The controller is configured to control the lubrication assembly to selectively engage one of the first-fourth pathways.

In accordance with additional or alternative embodiments, the three-way valve includes first, second and third legs and the lubrication assembly further includes a first line upstream from the second leg, a second line diverting off from the third leg and a third line leading from the second line to the first leg.

In accordance with additional or alternative embodiments, the first pathway is configured for pumping refrigerant through the chiller via the three-way valve and along the first and third legs, the second pathway is configured for pre-storing refrigerant in the chiller via the three-way valve and along the first line, the second and third legs and the second and third lines, the third pathway is configured for removing refrigerant from the chiller via the three-way valve and along the first leg and the first line, the second and third legs and the second line and the fourth pathway is configured for charging refrigerant into the chiller along the first line.

In accordance with additional or alternative embodiments, a pump is disposed along the third line to drive refrigerant movement along the first-third pathways.

In accordance with additional or alternative embodiments, a charge port is disposed at an entry to the fourth pathway and a remove part is disposed at an end of the third pathway.

According to another aspect of the disclosure, a lubrication assembly of a chiller is provided and includes a three-way valve having first, second and third legs, a first line upstream from the second leg, a second line diverting off from the third leg, a third line leading from the second line to the first leg, a first pathway by which refrigerant is pumped through the chiller via the three-way valve and along the first and third legs, a second pathway by which refrigerant is pre-stored in the chiller via the three-way valve and along the first line, the second and third legs and the second and third lines, a third pathway by which refrigerant is removed from the chiller via the three-way valve and along the first leg and the first line, the second and third legs and the second line and a fourth pathway by which refrigerant is charged into the chiller along the first line.

In accordance with additional or alternative embodiments, the three-way valve and the first-fourth pathways are operable by a controller.

In accordance with additional or alternative embodiments, a pump is disposed along the third line to drive refrigerant movement along the first-third pathways.

In accordance with additional or alternative embodiments, a charge port is disposed at an entry to the fourth pathway and a remove part disposed at an end of the third pathway.

According to yet another aspect of the disclosure, a method of operating a chiller system that includes a chiller, a lubrication assembly formed to define first-third pathways via a three-way valve and a fourth pathway and a controller is provided. The method includes configuring the first pathway for pumping refrigerant through the chiller, configuring the second pathway for pre-storing refrigerant in the chiller, configuring the third pathway for removing refrigerant from the chiller, configuring the fourth pathway for charging refrigerant into the chiller and operating the controller to selectively engage one of the first-fourth pathways.

In accordance with additional or alternative embodiments, the three-way valve includes first, second and third legs and the lubrication assembly further includes a first line upstream from the second leg, a second line diverting off from the third leg and a third line leading from the second line to the first leg.

In accordance with additional or alternative embodiments, the configuring of the first pathway comprises configuring the first pathway for pumping refrigerant through the chiller via the three-way valve and along the first and third legs, the configuring of the second pathway comprises configuring the second pathway for pre-storing refrigerant in the chiller via the three-way valve and along the first line, the second and third legs and the second and third lines, the configuring of the third pathway comprises configuring the third pathway for removing refrigerant from the chiller via the three-way valve and along the first leg and the first line, the second and third legs and the second line and the configuring of the fourth pathway comprises configuring the fourth pathway for charging refrigerant into the chiller along the first line.

In accordance with additional or alternative embodiments, the chiller system further includes a pump that is disposed along the third line to drive refrigerant movement along the first-third pathways.

In accordance with additional or alternative embodiments, the chiller system further includes a charge port disposed at an entry to the fourth pathway and a remove part disposed at an end of the third pathway.

These and other advantages and features will become more apparent from the following description taken in conjunction with the drawings.

BRIEF DESCRIPTION OF THE DRAWINGS

The subject matter, which is regarded as the disclosure, is particularly pointed out and distinctly claimed in the claims at the conclusion of the specification. The foregoing and other features, and advantages of the disclosure are apparent from the following detailed description taken in conjunction with the accompanying drawings in which:

FIG. 1 is a schematic diagram illustrating a chiller system in accordance with embodiments;

FIG. 6 is a flow diagram illustrating a method of operating a chiller system in accordance with embodiments.

DETAILED DESCRIPTION

Figure 3:
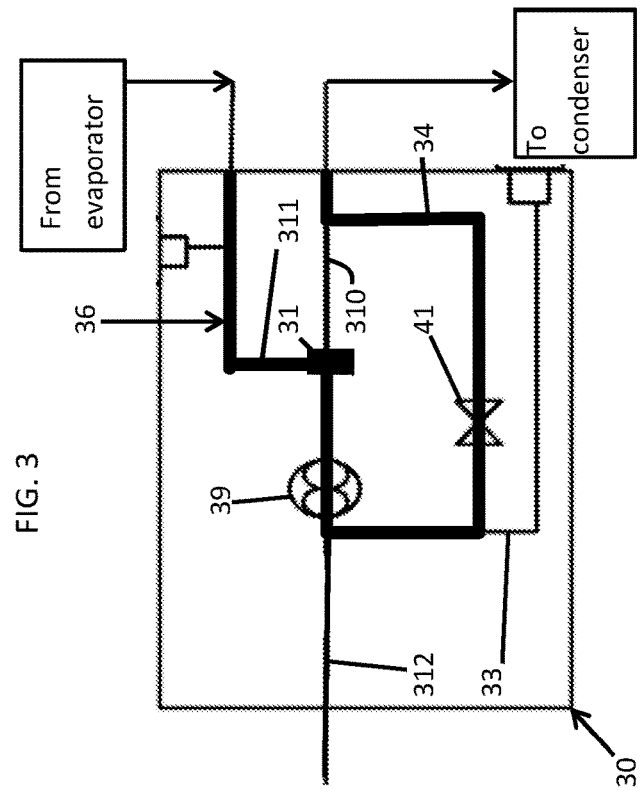
FIG. 3 is a schematic diagram illustrating a second operational configuration of a lubrication assembly of the chiller system of FIG. 1.

As will be described below, an integral lubrication pump on a chiller is effectively re-purposed into a refrigerant transfer pump for use during chiller service. This provides for a direct pump system and allows liquid refrigerant to be quickly pumped directly between the chiller and a storage vessel without the need for an external system. Chiller valves and controls that are already included in chiller systems can be employed to enable such a direct pump system during servicing operations which are greatly simplify and accelerate refrigerant transfer processes.

With reference to FIG. 1, a chiller system 10 is provided and includes a chiller 20, a lubrication assembly 30 and a controller 50. The chiller 20 includes a compressor 21, a condenser 22, an expansion assembly 23 and an evaporator 24. The compressor 21 may include, for example, a motor-generator element, a drive shaft 211 which is rotatable by the motor-generator element, first and second compressor stages 212 and 213 that are configured to be driven by rotations of the driveshaft 211. The driving of the first and second compressor stages 212 and 213 can be employed to compress inlet refrigerant vapor which is received in the compressor 21 from evaporator 24. The compressed refrigerant is then transmitted to the condenser 22 as vapor whereupon heat is removed from the vapor such that the vapor is condensed into liquid. This liquid is then sent to the expansion assembly 23 which expands a volume of the liquid to produce a liquid and vapor mixture of relatively low temperature and pressure which is transmitted to the evaporator 24 where the remaining liquid is vaporized prior to being returned to the compressor 21.

In accordance with embodiments, a portion of the refrigerant of the chiller system 10 is used as a lubricant for various components of the chiller 20. The components include, but are not limited to, bearings 214 and 215 of the compressor 21 which support rotations of the driveshaft 211. As such, and as will be described below, the controller 50 can control the lubrication assembly 30 such that the chiller system 10 is operable in multiple operational configurations that are supportive of the use of the refrigerant as lubricant. These multiple operational configurations include, but are not limited, to compressor operations, pre-storage operations, charge removing operations and charging operations.

To these ends, as shown in FIG. 1, the lubrication assembly 30 includes a three-way valve 31 that has a first leg 310, a second leg 311 and a third leg 312, a first line 32 that is fluidly disposed upstream from the second leg 311, a second line 33 that diverts off from the third leg 312 and a third line 34 that leads from the second line 33 to the first leg 310. The lubrication assembly 30 further includes a pump 39 and a two-way valve 41. The pump 39 is operably disposed on the third leg 312. The two-way valve 41 is operably disposed on the third line 34. The controller 50 is operably coupled to each of the three-way valve 31, the pump 39 and the two-way valve 41.

With continued reference to FIG. 1 and with additional reference to FIGS. 2-5, the lubrication assembly 30 further includes or otherwise defines first-fourth pathways 35-38.

The first pathway 35 (see FIG. 2) is engaged with the chiller system 10 executing the compressor operations and is configured for pumping refrigerant through the chiller 20 (i.e., from the condenser 22 to the compressor 21) via the three-way valve 31 and along the first and third legs 310 and 312. Here, the controller 50 controls the three-way valve 31 to fluidly connect the first and third legs 310 and 312, activates the pump 39 and closes the two-way valve 41.

The second pathway 36 (see FIG. 3) is engaged with the chiller system 20 executing pre-storage operations and is configured for pre-storing refrigerant in the chiller 20 (i.e., to move refrigerant from the evaporator 24 to pre-store it in the condenser 22) via the three-way valve 31 and along the first line 32, the second and third legs 311 and 312 and the second and third lines 33 and 34. Here, the controller 50 controls the three-way valve 31 to fluidly connect the second and third legs 311 and 312, activates the pump 39 and opens the two-way valve 41.

The third pathway 37 (see FIG. 4) is engaged with the chiller system 10 executing the charge removing operations and is configured for removing refrigerant from the chiller 20 (i.e., from the condenser 22 and the evaporator 24) via the three-way valve 31 and along the first leg 310 and the first line 32, the second and third legs 311 and 312 and the second line 33. Here, the controller 50 controls the three-way valve 31 to fluidly connect the first, second and third legs 310, 311 and 312, activates the pump 39 and closes the two-way valve 41.

The fourth pathway 38 (see FIG. 5) is engaged with the chiller system 10 executing the charging operations and is configured for charging refrigerant into the chiller 20 (i.e., into the evaporator 24) along the first line 32. Here, the controller 50 closes the three-way valve 31 to fluidly isolate first line 32.

The lubrication assembly 30 still further includes a charge port 43 and a remove port 44. The charge port 43 is disposed at an entry to the fourth pathway 38 and is configured to be coupled to a passive refrigerant storage tank 430 whereby the fourth pathway 38 is receptive of refrigerant for the charging operations. The remove port 44 is disposed at an end or exit of the third pathway 37 and is configured to be coupled to a passive refrigerant storage tank 440 whereby the third pathway 37 is provided for the charge removing operations.

First-fourth operational configurations of the lubrication assembly 30 will now be described with reference to FIGS. 2-5.

Figure 2:
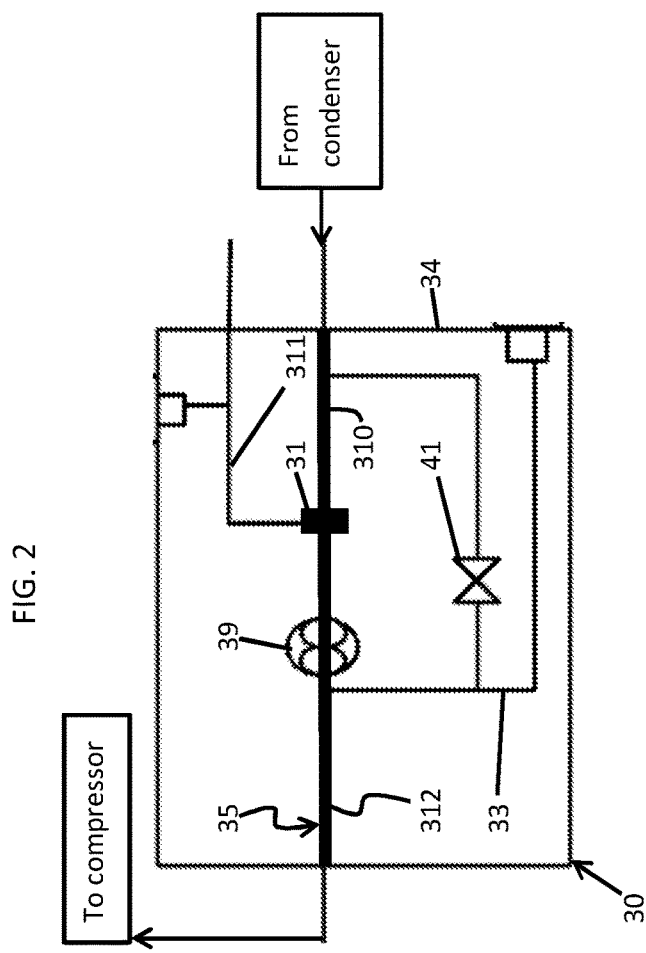
FIG. 2 is a schematic diagram illustrating a first operational configuration of a lubrication assembly of the chiller system of FIG. 1.

As shown in FIG. 2, the first pathway 35 is engaged with the chiller system 10 executing the compressor operations and is configured for pumping refrigerant from the condenser 22 to the compressor 21 via the three-way valve 31 and along the first and third legs 310 and 312. As noted above, this is achieved by the controller 50 controlling the three-way valve 31 to fluidly connect the first and third legs 310 and 312, activating the pump 39 and closing the two-way valve 41. Thus, refrigerant received from the condenser 22 flows through the first leg 310 to the three-way valve 31 and flows through the three-way valve 31 to the third leg 312. The refrigerant is then pumped to flow through the third leg 312 by the pump 39 and is prevented from flowing through the third line 34 by the closing of the two-way valve 41 and may be permitted to flow into but is prevented from escaping from the second line 33.

As shown in FIG. 3, the second pathway 36 is engaged with the chiller system 10 executing the pre-storage operations to rebalance the distribution of refrigerant in the chiller 20 at start-up for example and is configured for pumping refrigerant from the evaporator 24 to the condenser 22 via the three-way valve 31 and along the first line 32, the second and third legs 311 and 312 and the second and third lines 33 and 34. As noted above, this is achieved by the controller 50 controlling the three-way valve 31 to fluidly connect the second and third legs 311 and 312, activating the pump 39 and opening the two-way valve 41. Thus, refrigerant received from the evaporator 24 flows through the first line 32 and the second leg 311 to the three-way valve 31 and flows through the three-way valve 31 to the third leg 312. The refrigerant is then pumped to flow from the third leg 312 to the second line 33 and from the second line 33 to the third line 34 by the pump 39 due to the opening of the two-way valve 41. The refrigerant is thus restricted from flowing through the third leg 312 to the compressor 21 by the orifice 216 (see FIG. 1) and may be prevented from escaping from the second line 33.

Figure 4:
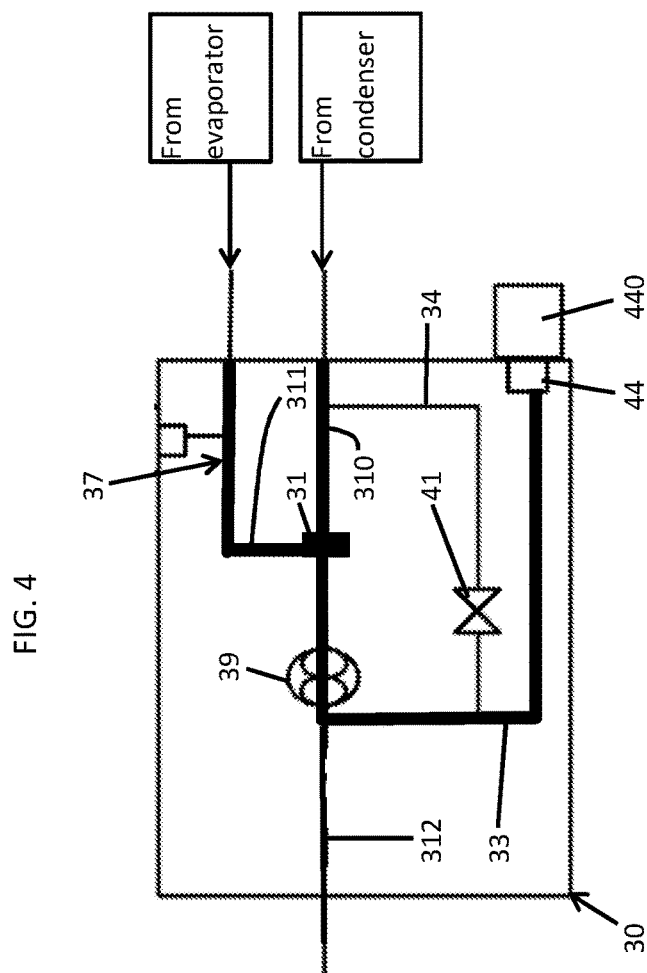
FIG. 4 is a schematic diagram illustrating a third operational configuration of a lubrication assembly of the chiller system of FIG. 1.

As shown in FIG. 4, the third pathway 37 is engaged with the chiller system 10 executing the charge removing operations to remove low pressure refrigerant from the chiller 20 during servicing operations and is configured for pumping refrigerant from the condenser 22 and the evaporator 24 via the three-way valve 31 and along the first leg 310 and the first line 32, the second and third legs 311 and 312 and the second and third lines 33 and 34. As noted above, this is achieved by the controller 50 controlling the three-way valve 31 to fluidly connect the first, second and third legs 310, 311 and 312, activating the pump 39 and closing the two-way valve 41. Thus, refrigerant received from the condenser 22 flows through the first leg 310 to the three-way valve 31 while refrigerant received from the evaporator 24 flows through the first line 32 and the second leg 311 to the three-way valve 31 and flows through the three-way valve 31 to the third leg 312. The refrigerant is then pumped to flow from the third leg 312 to the second line 33 and the passive refrigerant storage tank 440 by way of the remove port 44 by the pump 39 due to the closing of the two-way valve 41.

Figure 5:
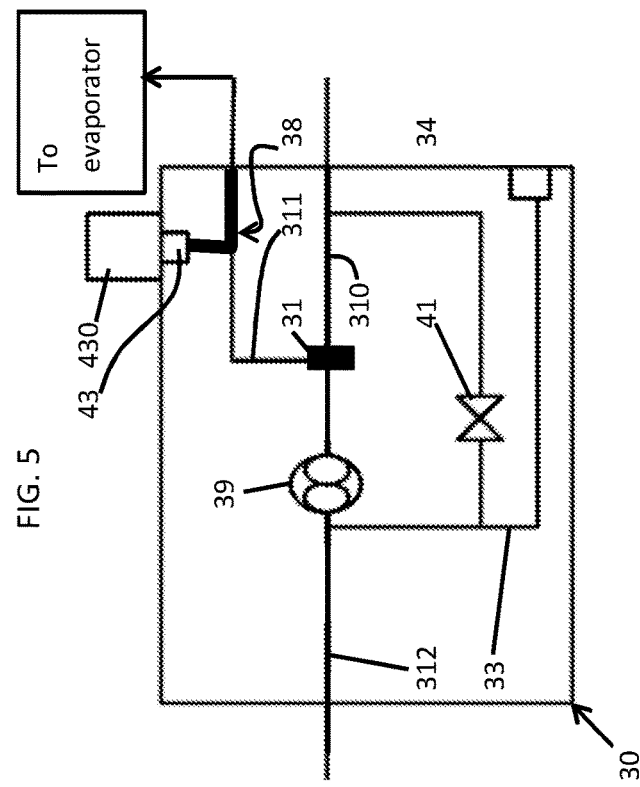
FIG. 5 is a schematic diagram illustrating a fourth operational configuration of a lubrication assembly of the chiller system of FIG. 1.

As shown in FIG. 5, the fourth pathway 38 is engaged with the chiller system 10 executing the charging operations to charge the chiller 20 with refrigerant following servicing operations and is configured for urging refrigerant into the evaporator 24 along the first line 32. As noted above, this is achieved by the controller 50 closing the three-way valve 31 to fluidly isolate the first line 32. Thus, refrigerant received from the passive refrigerant storage tank 430 by way of the charge port 43 flows through the first line 32 to the evaporator 24 without passing through the second leg 311 of the three-way valve 31.

With reference to FIG. 6, a method of operating the chiller system 10 as described above is provided. As shown in FIG. 6, the method includes configuring the first pathway 35 for pumping refrigerant through the chiller 20 (block 601), configuring the second pathway 36 for pre-storing refrigerant in the chiller 20 (block 602), configuring the third pathway 37 for removing refrigerant from the chiller 20 (block 603), configuring the fourth pathway 38 for charging refrigerant into the chiller 20 (block 604) and operating the controller 50 to selectively engage one of the first-fourth pathways 35-38 (block 605).

Benefits of the systems and methods described above include the fact that the integral pump can be configured to move liquid refrigerant into and out of the chiller efficiently so the chiller system as a whole can be opened for service. Meanwhile, direct pumping of liquid refrigerant through a single hose is simpler and faster than the conventional push/pull method and reduces chances of contamination with the multiple hose connections and bleed operations that are normally associated with the conventional push/pull method.

While the disclosure is provided in detail in connection with only a limited number of embodiments, it should be readily understood that the disclosure is not limited to such disclosed embodiments. Rather, the disclosure can be modified to incorporate any number of variations, alterations, substitutions or equivalent arrangements not heretofore described, but which are commensurate with the spirit and scope of the disclosure. Additionally, while various embodiments of the disclosure have been described, it is to be understood that the exemplary embodiment(s) may include only some of the described exemplary aspects. Accordingly, the disclosure is not to be seen as limited by the foregoing description, but is only limited by the scope of the appended claims.

What is claimed is:

1. A chiller system, comprising:
a chiller comprising: a compressor, a condenser, an expansion assembly and an evaporator in fluid communication with one another;
a lubrication assembly operably coupled to the compressor, the condenser and the evaporator, the lubrication assembly comprising a three-way valve and first-third pathways, each of which is communicative with the three-way valve, and the lubrication assembly further comprising a fourth pathway,
the first pathway being configured for pumping refrigerant through the chiller, the second pathway being configured for pre-storing refrigerant in the chiller in a storage location prior to further use, the third pathway being configured for removing refrigerant from the chiller and the fourth pathway being configured for charging refrigerant into the chiller; and
a controller in communication with the three-way valve of the lubrication assembly, the controller configured to control the lubrication assembly and the three-way valve to selectively engage one of the first-fourth pathways.

2. The chiller system according to claim 1, wherein the three-way valve comprises first, second and third legs and the lubrication assembly further comprises:
a first line upstream from the second leg;
a second line diverting off from the third leg; and
a third line leading from the second line to the first leg.

3. The chiller system according to claim 2, wherein:
the first pathway is configured for pumping refrigerant through the chiller via the three-way valve and along the first and third legs,
the second pathway is configured for pre-storing refrigerant in the chiller via the three-way valve and along the first line, the second and third legs and the second and third lines, the third pathway is configured for removing refrigerant from the chiller via the three-way valve and along the first leg and the first line, the second and third legs and the second line, and the fourth pathway is configured for charging refrigerant into the chiller along the first line.

4. The chiller system according to claim 2, wherein the lubrication assembly further comprises a pump disposed along the third line to drive refrigerant movement along the first-third pathways.

5. The chiller system according to claim 2, wherein the lubrication assembly further comprises:
   a charge port disposed at an entry to the fourth pathway; and
   a remove part disposed at an end of the third pathway.

6. A lubrication assembly of a chiller, the lubrication assembly comprising:
   a three-way valve having first, second and third legs;
   a first line upstream from the second leg;
   a second line diverting off from the third leg;
   a third line leading from the second line to the first leg;
   a first pathway by which refrigerant is pumped through the chiller via the three-way valve and along the first and third legs;
   a second pathway by which refrigerant is pre-stored in the chiller in a storage location prior to further use via the three-way valve and along the first line, the second and third legs and the second and third lines;
   a third pathway by which refrigerant is removed from the chiller via the three-way valve and along the first leg and the first line, the second and third legs and the second line; and
   a fourth pathway by which refrigerant is charged into the chiller along the first line.

7. The lubrication assembly according to claim 6, wherein the three-way valve and the first-fourth pathways are operable by a controller.

8. The lubrication assembly according to claim 6, further comprising a pump disposed along the third line to drive refrigerant movement along the first-third pathways.

9. The lubrication assembly according to claim 6, further comprising:
   a charge port disposed at an entry to the fourth pathway; and
   a remove part disposed at an end of the third pathway.

10. A method of operating a chiller system comprising a chiller, a lubrication assembly comprising a three-way valve and first-third pathways, each of which is communicative with the three-way valve, and the lubrication assembly further comprising a fourth pathway and a controller in communication with the three-way valve, the method comprising:
    configuring the first pathway for pumping refrigerant through the chiller;
    configuring the second pathway for pre-storing refrigerant in the chiller in a storage location prior to further use;
    configuring the third pathway for removing refrigerant from the chiller;
    configuring the fourth pathway for charging refrigerant into the chiller; and
    operating the controller to control the three-way valve to selectively engage one of the first-fourth pathways.

11. The method according to claim 10, wherein the three-way valve comprises first, second and third legs and the lubrication assembly further comprises:
    a first line upstream from the second leg;
    a second line diverting off from the third leg; and
    a third line leading from the second line to the first leg.

12. The method according to claim 11, wherein:
    the configuring of the first pathway comprises configuring the first pathway for pumping refrigerant through the chiller via the three-way valve and along the first and third legs,
    the configuring of the second pathway comprises configuring the second pathway for pre-storing refrigerant in the chiller via the three-way valve and along the first line, the second and third legs and the second and third lines,
    the configuring of the third pathway comprises configuring the third pathway for removing refrigerant from the chiller via the three-way valve and along the first leg and the first line, the second and third legs and the second line, and
    the configuring of the fourth pathway comprises configuring the fourth pathway for charging refrigerant into the chiller along the first line.

13. The method according to claim 11, wherein the lubrication assembly further comprises a pump disposed along the third line to drive refrigerant movement along the first-third pathways.

14. The method according to claim 11, wherein the lubrication assembly further comprises:
    a charge port disposed at an entry to the fourth pathway; and
    a remove part disposed at an end of the third pathway.

* * * * *